United States Patent [19]

Savino et al.

[11] Patent Number: 4,946,910

[45] Date of Patent: Aug. 7, 1990

[54] NOVEL NON-IONIC POLYURETHANE RESINS HAVING POLYETHER BACKBONES IN WATER-DILUTABLE BASECOATS

[75] Inventors: Thomas G. Savino, Northville; Thomas C. Balch, West Bloomfield; Alan L. Steinmetz, Milford; Sergio E. Balatin, West Bloomfield; Nicholas Caiozzo, St. Clair Shores, all of Mich.

[73] Assignee: BASF Corporation, Inmont Division, Clifton, N.J.

[21] Appl. No.: 288,434

[22] Filed: Dec. 22, 1988

Related U.S. Application Data

[62] Division of Ser. No. 77,353, Jul. 24, 1987, Pat. No. 4,794,147.

[51] Int. Cl.$^5$ ............................................. C08L 75/04
[52] U.S. Cl. ................................... 525/440; 528/45; 528/49; 525/453; 525/454; 525/458; 525/459; 525/460
[58] Field of Search ............... 525/440, 453, 454, 458, 525/459, 460; 528/45, 49

[56] References Cited

U.S. PATENT DOCUMENTS

| | | | |
|---|---|---|---|
| 3,905,929 | 9/1975 | Noll | 260/29.2 TN |
| 3,925,582 | 12/1975 | Sample, Jr. et al. | 427/385 |
| 4,094,842 | 6/1978 | Wenzel et al. | 260/29.2 TN |
| 4,190,566 | 2/1980 | Noll et al. | 260/29.2 |
| 4,489,135 | 12/1984 | Drexler et al. | 428/423.1 |
| 4,558,090 | 12/1985 | Drexler et al. | 524/591 |
| 4,588,787 | 5/1986 | Kordomenos et al. | 525/440 |
| 4,719,132 | 1/1988 | Porter, Jr. | 427/409 |

FOREIGN PATENT DOCUMENTS 1112394 11/1981 Canada .
2104085A 3/1983 United Kingdom .

*Primary Examiner*—Maurice J. Welsh
*Attorney, Agent, or Firm*—Kenyon & Kenyon

[57] ABSTRACT

This invention, therefore, relates to the field of polyurethane coatings for use in automobile basecoat/clearcoat systems. In particular, this invention relates to water-dispersible polyurethane resins having polyether sidechains which may be utilized in basecoat compositions as principal resins or grind resins. These polyurethane resins may be laterally stabilized or terminally stabilized. The terminally stabilized resins of this invention are preferably employed as principal resins in basecoat compositions.

42 Claims, No Drawings

NOVEL NON-IONIC POLYURETHANE RESINS HAVING POLYETHER BACKBONES IN WATER-DILUTABLE BASECOATS

This application is a division of application Ser. No. 077,353, filed July 24, 1987, now issued as U.S. Pat. No. 4,794,147.

BACKGROUND OF THE INVENTION

Multi-layer systems have been utilized to coat automobiles for a number of years, but the early development of these systems necessarily employed organic solvents. As environmental regulations became more stringent, and the cost of organic solvents rose, organic-borne systems became less desirable. The recent research emphasis in the area of multi-layer systems, especially basecoat systems has focused on the development of water-borne systems for multi-layer coatings.

The shift from organic solvents to water for dispersing and applying resins in multi-layer systems solved many of the environmental and cost problems associated with the use of organic solvents. Water-borne systems, however, have resulted in other problems.

One solution to these problems has been the development of anionic polyurethane resins as described, for example, in Ser. No. 038,385 now U.S. Pat. No. 4,179,168. These resins exhibit superior coating characteristics in many basecoat/clearcoat multi-layer systems. However, in certain instances these resins may not be compatible with strong acid catalyzed high-solids melamine-containing clearcoats, because of the tendency to exhibit wrinkling, and loss of DI (Distinctness of Image).

The polyurethane resins of the present invention, however, may be used in the above-described melamine-containing systems without the negative characteristics exhibited by anionic resins. Thus, the combination of non-ionic polyurethane basecoats with strong acid catalysed clearcoats allows for a lower composite Volatile Organic Content (VOC) than with anionic polyurethane basecoats.

The resins of the present invention have excellent water dispersibility properties, a surprising result considering the absence of salt-forming groups. It is particularly surprising that these resins maintain their water dispersibility even when formulated as principle resins in base coat compositions. It is also a surprising result, considering the water dispersibility of these resins, that the resins of the present invention coalesce and hold firmly onto a vertical panel.

In a further aspect of the present invention the resins are formulated into grind resins for use in basecoats. Yet, aqueous dispersions of nonionic polyurethanes are known in the literature and have been used to prepare films and coatings. Generally, polymer dispersions are unsuitable for use in milling pigments. It is quite surprising that the aqueous dispersions of the nonionic polyurethanes of the present invention are effective grind resins for a wide variety of pigments.

The present inventions, in part, directed to polyurethane coatings to be used in formulating basecoat compositions of multi-layer coating systems. These resins exhibit superior coating characteristics, for example, good metallic effects such as very favorable arrangement, fixation, and flip effect of the metallic pigments in the paint film. When non-metallic pigments are used, the resins of the present invention exhibit a high level of decorative effect.

This invention, therefore, relates to the field of polyurethane coatings for use in automobile basecoat/clearcoat systems. In particular, this invention relates to the discovery that incorporating polyether-containing compounds into the backbone of a polyurethane resin provides basecoat coating compositions for a number of substrates.

These polyurethane coating compositions exhibit coating characteristics superior to those taught by the art and are especially useful as basecoats for automobiles.

It is an object of this invention to provide polyether-containing polyurethane resins that can be incorporated into basecoat formulations as principle resins and/or grind resins. It is an additional object of this invention to provide water-dispersible resins which are water-dispersible without incorporating salt-forming groups into the resins.

It is an additional object of this invention to provide water-dispersible polyurethane resins which exhibit superior coating and cosmetic characteristics.

It is a further object of this invention to provide aqueous polyurethane dispersions having favorable characteristics for formulating grind resins.

It is also an object of this invention to provide a method of producing the resins and basecoat compositions described herein.

It is a further object of this invention to provide a method for coating a metallic or plastic substrate utilizing the resins and basecoat formulations of the present invention.

These and other objects of the present invention are furthered by incorporating polyether-containing polyurethane resins into basecoat formulations.

SUMMARY OF THE INVENTION

Two types of polyether-containing polyurethane resins are described in the present invention. We have termed these two types of resins laterally stabilized and terminally stabilized.

Specifically, this invention relates to a laterally stabilized polyurethane coating composition comprised of:
1. at least one organic compound having at least two reactive hydrogen atoms;
2. a nonionic stabilizer prepared by the reaction of:
   (i) a monofunctional polyether with a first polyisocyanate-containing compound to produce a partially capped isocyanate intermediate; and
   (ii) a compound having at least one active amine hydrogen and at least two active hydroxyl groups; and
3. at least one second polyisocyanate-containing compound.

The organic compound preferably comprises a polyester polyol, a low molecular weight diol/triol or mixtures, thereof. Optionally, a capping agent is employed to cap any remaining free isocyanate moieties.

In addition, this invention also relates to terminally stabilized polyurethane compositions comprised of:
(1) at least one organic compound having at least two reactive hydrogen atoms;
(2) a monofunctional polyether; and
(3) a polyisocyanate.

The organic compound of the terminally stabilized polyurethane compositions preferably comprises a polyester polyol, a low molecular weight diol and/or triol, or mixtures thereof. Optionally, a separate trifunctional hydroxyl containing monomer is employed for use in the polyurethane resins of the present invention. Optionally, a capping agent is employed to cap any remaining free isocyanate moieties In the laterally stabilized polyurethane resins, the incorporation of the polyether groups functions to chain extend the polyurethane resin. In contrast, the incorporation of the polyether groups in the terminally stabilized polyurethane resin functions to terminate the resin. The two types of polyurethane resins described above can be formulated as a water-dispersed basecoat composition which contains in addition to either of the above-described resins a grind resin, a cross-linking agent, thixotropic or rheology control agents, thickeners, pigments, aluminum and/or mica particles, basifying agents, water, fillers, surfactants, stabilizers, plasticizers, wetting agents, dispersing agents, adhesion promotors, defoamers, catalysts, and additional polymers.

In preferred embodiments of basecoat compositions of the present invention, the terminally stabilized polyurethane resin is utilized as the principle resin and the laterally or terminally stabilized polyurethane resins is utilized as the grind resin.

After formulation, the basecoat composition can be sprayed or deposited onto an automobile body, preferably, in one or two coats. Generally, two even coats of basecoat are applied with a several minute flash between coats. After deposition of the basecoat, before application of a high solids content clear coat, it is generally preferred to flash about 90% of the water from the basecoat for optimum appearance and to eliminate water boil of the clearcoat.

In both the linear and branched chain polyurethane resin, a polyester polyol resin is preferably a major component.

The polyester polyol resins described hereinabove are themselves useful on virtually any elastomeric substrate, but they are particularly useful when formulated into polyurethane coatings and used in basecoat formulations for deposition onto metal or plastic substrates, especially automobile bodies.

The polyester component may be any type, i.e., branched or unbranched, and is formed from the reaction of at least one dicarboxylic acid component and at least one alcohol component wherein the alcohol has at least two hydroxyl Virtually any carboxylic acid-containing compound having two or more carboxylic acid moieties or equivalents that are useful in synthesizing polyester compounds are useful in the present invention.

The carboxylic acid component may, of course, be comprised of short-chain dicarboxylic acid compounds, long chain dicarboxylic acid compounds, or mixtures thereof. By short chain dicarboxylic acids we mean compounds having at least two carboxylic acid moieties and fewer than 18 carbon atoms in the chain. These dicarboxylic acids may be alkyl, alkylene, aralkyl, aralkylene, and arylene, among others. In the polyester resins of the present invention the carboxylic acid containing compound may be polyfunctional with 2 or more carboxy groups. A preferred carboxylic-containing compound for use in branched polyester resins is trimellitic anhydride. Short-chain alkyl or aryl dicarboxylic acid compounds for example azeleic acid, adipic acid, or an equivalent aliphatic or aromatic acid are preferred. A preferred aromatic dicarboxylic acid is isophthalic acid.

The carboxylic acid component may also be comprised of a long-chain dicarboxylic acid component. This long-chain dicarboxylic acid containing compound may be an alkyl, alkylene, aralkyl, aralkylene or similar compound, but it must be stressed that virtually any long-chain dicarboxylic acid containing compound may be used. An especially preferred long-chain carboxylic acid-contining compound is C36 dicarboxylic acid known as dimer acid. A discussion of dimer acid can be found in U.S. Ser. No. 038,385 which is incorporated by reference herein. As in the case of the short-chain dicarboxylic acid-containing compounds, linear dicarboxylic acid-containing compounds may be preferably used in linear polyurethane resins, and linear or branched dicarboxylic acid containing compounds may be preferably used in branched chain polyurethane resins.

In addition to the carboxylic acid containing compound, the polyester resin is also comprised of one or more low molecular weight diols or triols. We have termed any compound having more than one alcohol a polyol. Polyols may be diols (di-alcohol containing), triols (tri-alcohol containing) or higher alcohol-functional compounds in the case of the branched-chain polyurethanes, the amount and type of triol-containing compounds may be varied to increase the branching effect. A preferred trialcohol-containing compound for use in the branched chain polyesters is trimethylol propane.

The polyester resin or mixture of polyester resins utilized to synthesize the polyurethane resins preferably are hydroxyl terminated. This is effected by synthesizing the polyester using an excess of a diol or triol-containing compound. The relative weights of the carboxylic acid component and alcohol-containing compound depend upon the desired chain length of the polyester compound employed. The result of this synthesis is a polyester having two or more free hydroxyl groups (polyesterdiol or polyol).

The composition of the carboxylic acid component and polyol component employed to synthesize the preferred polyester resins is such as to provide an excess of the polyol over and above the total number of equivalents of acid present in the mixture. In other words, the reactants should be selected, and the stoichiometric proportions of the respective acid and polyol components should be adjusted to give hydroxy-terminated, polyester molecules each theoretically having a hydroxyl functionality of 2 or more.

Monocarboxylic acid and monoalcohols may also be used in the polyester synthesis, but these are generally utilized for the purpose of chain terminating a polyester resin. As a general rule, where used, the monocarboxylic acids and/or monoalcohols comprise a very small percentage by weight of the final polyester resin.

As a general rule the polyester diol component comprises between about 20% and 80% by weight of the final polyurethane resin. Preferably the polyester diol comprises between about 50 and 70% by weight of the polyurethane resin and most preferably the polyester diol comprises between about 5 and 65% by weight.

While it is recognized that almost any size chain length of polyester polyol can be utilized, it is preferable to use a polyester diol within the molecular weight range of between 500 and 5000. It is preferable that the molecular weight range of the polyester diol component be between 1,000 and 3,500.

In addition to the polyester diol, the polyurethane resins of the present invention are also comprised of additional organic compounds having at least two reactive hydrogen atoms. This component is preferably a low molecular weight diol or triol compound but may contain alcohol groups, thiols and/or amines or mixtures of these functionalities. The same alcohol-containing compounds utilized to synthesize the polyester-containing compound may be utilized as a separate component here. Thus, any di or tri-alcohol containing compound may be used, for example neopentyl glycol and 1,6 hexanediol. High molecular weight diols and triols are not preferred, however, where the hydrophobicity of their molecular chains impacts on the water-dispersibility of the final polyurethane resins. The purpose of this alcohol containing component is to provide chain extension and/or branching through the isocyanate containing compounds. Thus, depending upon the desired amount of chain extension and/or branching desired in the final polyurethane resin, varying weight percentages and types of diols and/or triols may be utilized. Where linear polyurethane resins are desired the ratio of diol-containing compounds to triol-containing compounds may be higher than when or branched chain polyurethane compounds are desired.

The amount of low molecular weight diol and/or triols utilized in the polyurethane resins of the present invention may vary between 0 and 20 percent by weight of the polyurethane resin. Preferably this low molecular weight alcohol component comprises between about 0 and 10 percent of the polyurethane resin and most preferably comprises between about 1 and 6% by weight of the polyurethane resin.

The polyurethane resins of the present invention further comprise a polyisocyanate, preferably a diisocyanate. Generally, the diisocyanate comprises between about 5 and 40% by weight of the final polyurethane resin. Preferably, the diisocyanate comprises between about 10 and 30 percent by weight of the final resin and most preferably comprises between about 10 and 20 percent by weight of the polyurethane resin.

A polyether-containing compound provides the polyurethane resin with the preferred water dispersibility characteristics. These water-dispersibility characteristics are inured to the polyurethane resins of the present invention without the need to incorporate salt-forming groups within the resin. The absence of salt-forming groups enables the polyurethane resins to be incorporated into basecoat compositions which may be utilized in combination with strong acid catalysed high solids melamine-containing clearcoats. This results in a lower composite VOC coating which does not exhibit the same wrinkling, loss of DI (distinctive image) "browning" effects shown by the cation-containing polyurethane resins.

Two different approaches for incorporating polyether segments into the polyurethane resins are available depending upon the type of polyurethane resin desired. The approach to synthesizing a laterally stabilized polyurethane utilizes a polyether diol prepared from the reaction of a monofunctional polyether with a diisocyanate to form a polyether half-capped diisocyanate. This half-capped diisocyanate is then reacted with a compound having one active amine hydrogen and at least two active hydroxyl groups to form a non-ionic stabilizer (polyether diol) having a polyether chain, a urea moiety, a urethane moiety, and two free hydroxyl groups.

Once synthesized, the non-ionic stabilizer is then added to a reaction mixture comprised of at least one organic compound having two or more reactive hydrogen functionalities, and an excess of a polyisocyanate-containing compound (in addition to that which is incorporated into the nonionic stabilizer). Preferably a polyester polyol is also added to form the polyurethane. Optionally, a capping agent, for example, trimethylol propane or diethanolamine may be used to cap any remaining free isocyanate groups. The resulting laterally stabilized polyurethane resin may be formulated in a basecoat composition and is preferably utilized as a grind resin. The laterally stabilized polyurethane resin may also be formulated as a principal resin, but for purposes of the present invention, the terminally stabilized polyurethane resin is preferably utilized as the principal resin, and can also be used as a grind resin.

The polyether component which instills water dispersible characteristics to the laterally stabilized and the terminally stabilized branched-chain polyurethane resin is a polyether having one functional group, for example methoxypolyethylene glycol, among others. The polyether component is generally produced by utilizing a monoalcohol initiated polymerization of ethylene oxide, propylene oxide or mixtures thereof. The functional group on the polyether compound may be any group reactive with isocyanates to form a stable product. Thus, the polyether compound may contain a free hydroxyl, thiol, or amine, but hydroxyl functionalities are preferred to minimize the possibility of salt formation.

In the laterally stabilized polyurethane resin, the monofunctional polyether compound is, as previously described, reacted with a poly-isocyanate-containing compound to form a half-capped isocyanate. This half-capped isocyanate is then reacted with a compound having an amino active hydrogen and at least two free hydroxyl groups (or equivalent functionalities). This resulting product, termed the nonionic stabilizer, is then incorporated into the polyurethane resin by reaction with the other components. In contrast, in the terminally stabilized polyurethane resin, the polyether functionalitiy is incorporated into the resin as the monofunctional polyether.

The monofunctional polyether compound is reacted with a mixture comprised of at least one polyester polyol, a polyisocyanate, and in addition, optionally a short chain low molecular weight diol or higher functional polyol, or mixtures of diols and polyols. Optionally, a capping agent, for example, trimethylolpropane or diethanol amine may be used.

For the terminally stabilized polyurethane, the polyester diol preferably comprises between 20 and 80% by weight of the final polyurethane resin and generally has a molecular weight between about 500 and 5,000, preferably between 1,000 and 3,500. Preferably, the polyester polyol component comprises between about 50 and 70% and most preferably between about 55 and 65% by weight of the polyurethane resin.

The terminally stabilized polyurethane resin may be comprised of the same weight percentages of the low molecular weight diol/triol component as the laterally stabilized polyurethane resin. Where these alcohol-containing compounds are mixed, it is preferred that the ratio of triol/diol be higher for the terminally stabilized polyurethane resins than in the case of laterally stabilized polyurethane resins.

The same weight percentages of polyisocyanate used in the laterally stabilized polyurethane are used in the terminally stabilized polyurethane. Preferably, the polyisocyanate is a diisocyanate comprising between about 10 and 30% and most preferably between about 10 and 20% by weight of the polyurethane.

In both the laterally stabilized and terminally stabilized polyurethane resins, the polyether component may be multi-functional (the functional groups being hydroxyls, thiols, or amines with hydroxyl groups preferred), and preferably is a mono or di- functional polyether with monofunctional polyethers being particularly preferred. In general, water soluble polyether-containing compounds are useful in embodiments of the present invention. Polyethers formed from monoalcohol initiated polymerization of ethylene oxide, propylene oxide and mixtures, thereof are preferred. Of course, very minor amounts of butylene oxide ethers and other longer chain ethers may be incorporated into the polyether chain without adversely affecting the water dispersibility of the resins. Most preferably, ethylene oxide polymers comprise 100% of the polyether component. In general, the polyether containing component comprises between about 2 and 40% by weight of the polyurethane, preferably betwen about 8 and 30% by weight, and most preferably between about 10 and 25% by weight of the final polyurethane resin.

The molecular weight of the polyether-containing compounds in general ranges from about 500 to about 7000, preferably ranges from about 1000 to 4000, and most preferably ranges from about 1200 to 3000.

The polyurethanes of the present invention are advantageously storage stable and are, of course, water dispersible. The water dispersibility of the resins is controlled by the amount of polyether character contained in the final resin particles and the hydrophobicity of the non-polyether components.

DETAILED DESCRIPTION OF THE INVENTION

The present invention relates to a water-soluble nonionic polyurethane resin produced by incorporating a polyether-containing compound into the resin. The invention of the present application relates to lateral stabilization polyurethane resins and terminal stabilization polyurethane resins having polyether side chains. The laterally stabilized polyurethane resin is preferably comprised of the reaction product of :

1) a polyester polyol which is further comprised of the reaction product of a carboxylic acid-containing product having at least two carboxylic acid functionalities and a compound having at least two alcohol functionalities.

2) at least one low molecular weight compound having at least 2 alcohol functionalities.

3) at least one polyisocyanate-containing compound;

4) a nonionic stabilizer prepared by the reaction of a monofunctional ether with a polyisocyanate containing compound to produce a partially capped polyisocyanate followed by reaction with a compound containing at least one active amine hydrogen and at least two active hydroxyl groups and;

5) optionally, a capping agent is used to cap any remaining isocyanate groups that have not yet reacted.

The terminal stabilization polyurethane resin is preferably comprised of the reaction product of:

1) a polyester polyol, 2) at least one low molecular weight diol or triol;

3) a polyisocyanate;

4) a trihydroxy-containing monomer;

5) a monofunctional hydroxy-containing polyether; and 6) optionally, a capping agent.

The polyester component is not particularly critical to the present invention, but it is necessary that the polyester component be compatible with the desired water-dispersible characteristics of the resins described herein.

Thus, the carboxylic acid component of the polyester may be comprised of long-chain dicarboxylic acids, short-chain dicarboxylic acids, mixtures thereof or carboxylic acid equivalents such as anhydrides, lactones, and polycarbonates, among others. Long-chain monocarboxylic acids may also be used, but these are generally employed to chain terminate the polyester resin.

The shorter chain carboxylic acid component, if used, may be comprised of a mono-, di- or higher functionality carboxylic acids or a mixture of these carboxylic acids having carbon chains of 18 or fewer carbon units. Monocarboxylic acids function to terminate a polyester chain and are chosen for that purpose. It is preferable that the short chain carboxylic acid component be a dicarboxylic acid. Such preferred dicarboxylic acid compounds include, for example, adipic, azeleic, and other aliphatic dicarboxylic acids, however, any dicarboxylic acid-containing compound compatible with the goal of maximizing water-dispersibility may be utilized. Aromatic dicarboxylic acids may also be employed. An especially preferred aromatic dicarboxylic acid is isophthalic acid. Alkylene and aralkylene carboxylic acids may also be used. Where branched-chains in the polyester are desired, a carboxylic acid containing three or more carboxylic acid groups, for example citric acid, may be used. A preferred carboxylic acid-containing compound of this type is trimellitic anhydride.

The polyester resins are synthesized from the above-described carboxylic acid component and an excess of a polyol component. An excess of polyol is used so that the polyester resin preferably contains terminal hydroxyl groups. The polyol compounds preferably have an average hydroxy-functionality of at least 2.

The polyester resin in most cases is comprised of one or more polyols, preferably a diol. Up to about 25 percent by weight of the polyol component may be a polyol having three or more hydroxy groups per molecule. Where polyols having three or more hydroxy groups are chosen, the result is a branched polyester. As a general rule, the laterally stabilized polyurethane resin is comprised of a polyester having no more than about 15 percent by weight of the alcohol-containing component of a polyol having three or more alcohol functionalities. The terminal stabilization polyurethane may be comprised of the same relative percentages of tri-alcohol-containing component as that of the polyester utilized in the lateral stabilization polyurethane, or alternatively, may be comprised of a tri-alcohol-containing polyol of up to 25 percent by weight of the polyol component.

While it is not always desirable to have a triol or higher multi-functional alcohol present because of the tendency to form a branched chain polyester, some branching may be desirable, especially in the case where the polyester is to be incorporated into a branched polyurethane. There may also be present a small amount of monoalcohol in the polyol component, particularly if larger proportions of higher functional alcohols are used. These monoalcohols serve as chain terminators.

The diols which are usually employed in making the polyester resins include alkylene glycols, such as ethylene glycol, propylene glycol, butylene glycol, and neopentyl glycol, 1,6 hexanediol and other glycols such as hydrogenated bisphenol A, cyclohexane dimethanol, caprolactone diol (i.e., the reaction product of caprolactone and ethylene glycol), hydroxyalkylated bisphenols, and the like. However, other diols of various types and, as indicated, polyols of higher functionality may also be utilized. Such higher functional alcohols can include, for example, trimethylolpropane, trimethylolethane, pentaerythritol, and the like, as well as higher molecular weight polyols.

The low molecular weight diols which are preferred in the present invention are well known in the art. They have hydroxy values of 200 or above, usually within the range of about 1500 to 2000. Such materials include aliphatic diols, particularly alkylene polyols containing from 2 to 18 carbon atoms. Examples include ethylene glycol, 1,4-butanediol, cycloaliphatic diols such as 1,2 cyclohexanediol and cyclohexane dimethanol. An especially preferred diol is 1,6 hexanediol.

To produce the laterally stabilized polyurethane resins which are useful in basecoat compositions of the present invention, the above-described polyester polyol is reacted with a mixture of a polyisocyanate, optionally a low molecular weight diol and/or triol, and a nonionic stabilizer comprised of, in part, a polyether containing compound. Two general synthetic approaches are utilized to synthesize the polyurethane resins of the present invention. The first approach is to react all products in one pot using an excess of hydroxy equivalents when synthesizing the polyurethane resin (capping occurs simultaneously with the synthesis of the polyurethane resin). Alternatively, an excess of isocyanate is utilized to form an intermediate polyurethane which is then capped with a capping agent such as trimethylol propane, diethanolamine, diols, or mixtures of diols, triols, etc.

The polyester polyol, polyisocyanate, low molecular weight diols and/or triols, and nonionic stabilizer may be reacted in the same pot, or may be reacted sequentially, depending upon the desired results. Sequential reaction produces resins which are more ordered in structure. Both the polyester and triol containing compounds may serve as chain extenders to build up the polyurethane backbone through reaction of hydroxyl groups with isocyanate groups. Additional chain extenders having at least two active hydroxyl groups (diols, thiols, amines, or mixtures of these functional groups) may be added to increase the chain length or to change the chemical characteristics of the polyurethane resin. An excess of polyisocyanate is preferably used so that an intermediate polyurethane resin can be produced having free isocyanate groups at the ends. The free isocyanate groups may then be preferably capped with trimethylol propane or diethanolamine. The low molecular weight diols/triols/higher functional alcohols which are utilized as a separate component in synthesizing the polyurethane resins of the present invention include alkylene glycols, for example ethylene glycol, propylene glycol, butylene glycol, and neopentyl glycol, among others. Additional alkylene glycols include cyclohexane dimethylol and caprolactone diol. Exemplary higher functional alcohols include trimethylol propane, trimethylolethane and pentaerythritol.

The organic polyisocyanate which is reacted with the polyester polyol and low molecular weight diol and/or triol material as described is essentially any polyisocyanate, i.e., any compound containing at least two isocyanate groups, and is preferably a diisocyanate, e.g., hydrocarbon diisocyanates or substituted hydrocarbon diisocyanates. Many such organic diisocyanates are known in the art, including p-phenylene diisocyanate, biphenyl 4,4'diisocyanate, toluene diisocyanate, 3,3'-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI) and methylene-bis- (4 cyclohexylisocyanate). There can also be employed isocyanate-terminated adducts of diols, such as ethylene glycol, or 1,4-butylene glycol, etc. These are formed by reacting more than one mol. of a diisocyanate, such as those mentioned, with one mol. of a diol to form a longer chain diisocyanate. Alternatively, the diol can be added along with the diisocyanate.

While diisocyanates are preferred, other multifunctional isocyanates may be utilized. Examples are 1,2,4-benzene triisocyanate and polymethylene polyphenyl isocyanate.

It is preferred to employ an aliphatic diisocyanate, since it has been found that these provide better color stability in the finished coating. Examples include 1,6-hexamethylene diisocyanate, 1,4-butylene diisocyanate, methylene bis (4-cyclohexyl isocyanate) and isophorone diisocyanate 2,4 toluene diisocyanates is also preferred. Mixtures of diisocyanates can also be employed.

The proportions of the diisocyanate, polyester, diol and/or triol component and nonionic stabilizer or monofunctional polyether are chosen so as to provide an isocyanate terminated intermediate polyurethane resin. This can be accomplished by utilizing a stoichiometric excess of polyisocyanate, i.e., more than one isocyanate group per nucleophilic moiety (reactive with isocyanate) in the other components. The free isocyanates that remain after reaction may then be capped with a capping agent, for example, trimethylol propane.

Longer-chain polyurethane resins may be obtained by chain extending the polyurethane chain with diol and/or triol-containing compounds. In addition, although it is not preferred, additional chain extending compounds having at least two active hydrogen groups for example diols, dithiols, diamines, or compounds having a mixture of hydroxyl, thiol, and amine groups, for example, alkanolamines, aminoalkyl mercaptans, and hydroxyalkyl mercaptans, among others may be used. For purposes of this aspect of the invention both primary and secondary amine groups are considered as having one active hydrogen. Alkanolamines, for example, ethanolamine or diethanolamine, may be used as chain extenders, and most preferably, a diol is used.

Examples of preferred diols which are used as polyurethane chain extenders include 1,6 hexane diol, cyclohexanedimethylol, and 1,4-butanediol. A particularly preferred diol is neopentylglycol. Polyhydroxy compounds containing at least three hydroxyl groups may also be used as chain extenders; the use of these compounds produces branched polyurethane resins. For purposes of the present invention, if it is preferred to minimize the amount of branching in the polyurethane resin these polyhydroxy compounds should be limited to a very minor component of the polyurethane producing mixture. These higher functional polyhydroxy compounds include, for example, trimethylolpropane, trimethylolethane, pentaerythritol, among other compounds.

The polyurethane resin may be chain extended in any monomer using these diol and triol containing compounds or alternative compounds having at least two active hydrogen groups. Thus, these compounds may be added to the mixture of polyisocyanate, polyester, and polyether containing compound, (nonionic stabilizer or monofunctional polyether compound), or alternatively, may react at an intermediate stage, to link two free isocyanate groups that are present at the terminal ends of an intermediate polyurethane resin.

The polyether containing compounds, as described hereinabove, are preferably mono or di-functional polyethers with mono-functional polyethers being particularly preferred. The monofunctional polyethers are preferably formed from monoalcohol initiated polymerization of ethylene oxide, propylene oxide, and mixtures thereof. A polyether compound comprised of 100% ethylene oxide units is especially preferred. In its most preferred embodiment, the monofunctional polyether comprises between 10 and 25% by weight of the final polyurethane resin and has a molecular weight of between 1200 and 3000.

It is generally preferred that an intermediate polyurethane resin produced by reacting the polyester resin and the mixture of polyisocyanate, diol/triol mixture and polyether-containing compound be terminated with free isocyanate groups. To accomplish this, an excess of the polyisocyanate is used. Thus, the diols/triols, polyether component and polyester diol will all react with isocyanate moieties to produce polyurethane resins having at least some free isocyanate groups. Of course, the molar ratio of the other components will be adjusted according to the desired characteristics of the intermediate and final polyurethane resins.

In one especially desirable embodiment of the invention, a multi-functional alcohol, for example, trimethylol propane is used to terminate the reaction (cap the free isocyanate groups) at the desired stage (determined by the viscosity and isocyanate groups present), thereby also contributing residual hydroxyl groups. Particularly desirable for such purposes are aminoalcohols, such as ethanolamine, diethanolamine and the like, since the amino groups preferentially react with the isocyanate groups present. These capping agents are especially preferred for use in the grind resin aspect of the present invention. Multi-functional alcohols, such as ethylene glycol, trimethylolpropane and hydroxyl-terminated polyesters, can also be employed in this manner.

While the ratios of the components of the polyester, the multi-functional isocyanate, the diol/triol mixture, the polyether containing compounds, and the capping agent can be varied, it will be noted by those skilled in the art that the amounts should be chosen so as to avoid gellation and to produce an ungelled, urethane reaction product containing hydroxyl groups. The hydroxyl value of the final polyurethane reaction product should be at least 5 and preferably about 20 to about 200.

The amount of polyisocyanate used in the mixture is preferably between about 10% and 30% by weight of the reactants in the mixture, and most preferably between about 10 and 20%, but will vary depending upon the polyester used and the desired molecular weight of the final polyurethane resin. The amount of polyisocyanate will also vary depending upon whether it is desired to have the intermediate polyurethane terminated with free isocyanate groups or with hydroxyl groups. Thus, where it is preferred to terminate the intermediate polyurethane resin with free isocyanates for capping with trimethylopropane or diethanolamine, an excess of polyisocyanate may be used. Where the intermediate polyurethane resin is to be terminated by hydroxyl groups, a stoichiometric deficiency of polyisocyanate may be used.

The polyurethane resins of the present invention are formulated, along with other components, into water dispersible basecoat compositions which are sprayed or electrostatically deposited onto metal or plastic substrates, for example, automobile bodies. In general, a polyurethane resin, formulated as described herein, is mixed with an aminoplast resin, a polyisocyanate or other cross-linking agent, a grind resin, water, a portion of an organic solvent, pigments and a rheology control agent. Other agents may be included, for example, various fillers, surfactants, plasticizers, stabilizers, wetting agents, dispersing agents, defoamers, adhesion promoters and catalysts in minor amounts. In one embodiment a branched-chain polyester component may also be added to the basecoat composition.

As indicated, an aqueous dispersion of the polyurethane resin is utilized as the principal or major vehicle resin. In general, the principal or major vehicle resin comprises between about 0 and 90% by weight of the total solids present in the basecoat composition. An acceptable polyurethane resin for use as the principal resin is a resin produced from a polyester synthesized from dimer fatty acid, isophthalic acid, and 1,6 hexanediol. The resulting polyester is then reacted with a diisocyanate of isophorone, a triol and a polyether monoalcohol and a diol, for example, neopentyl glycol. The resulting polyurethane intermediate having free isocyanate groups is then reacted with trimethylolpropane to cap these groups.

The polyurethane reaction product as described above may be mixed with an aminoplast resin or a polyisocyanate cross-linking agent. Aminoplast resins are aldehyde condensation products of melamine, urea, and similar compounds. Products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine acetoguanamine, ammeline, 2-chloro-4,6-diamino-1,3,5-triazine, 6-methyl-2,4-diamino,1,3,5-triazine, 3-5-diamino-triazole, triaminopyrimidine, 2-mercapto-4,6-diaminopyrmidine, 2,4,6-triethyl triamino-1,3,5-triazine, and the like.

While the aldehyde employed is most often formaldehyde, other similar condensation products can be made from other aldehydes, for example, acetaldehyde, crotonaldehyde acrolein, benzaldehyde, furfural, and others.

The amine-aldehyde condensation products may contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol, as well as benzyl alcohol and aromatic alcohols, cyclic alcohols, for example, cyclohexanol, monoethers or glycols such as Cellosolves and Carbitols TM (Union Carbide), and halogen-substituted or other substituted alcohols, such as 3-chloropropanol. The preferred amine-aldehyde resins are etherified with methanol or butanol.

Alternatively, isocyanate-containing compounds such as those previously described may be used as cross-linking agents. Generally, when polyisocyanates are used they comprise between about 1 and 50% of the basecoat composition. Preferably, a fully blocked polyisocyanate is used as a crosslinking agent.

In the preparation of the blocked organic polyisocyanate any suitable organic polyisocyanate may be used. Examples include the aliphatic compounds such as trimethylene, tetramethylene, hexamethylene, 1,2-propylene, 1,2-butylene. 2,3-butylene, 1,3-butylene, ethylidine and butylidene diisocyanates; the cycloalkylene compounds such as 1,3-cyclopentane, 1,4-cyclohexane, and 1,2-cyclohexane diisocyantes; the aromatic compounds such as an phenylene, p-phenylene, 4,4'-dipheny-1,1,5-naphthalene and 1,4-naphthalene diisocyanates, the aliphatic-aromatic compounds such as 4,4' diphenylene methane, 2,4 or 2,6-tolylene, or mixtures thereof, 4,4' toluidine, and 1,4-xylylene diisocyanates: the nuclear substituted aromatic compounds such as dianisidine diisocyanate,4,4'-diphenylether diisocyanate and chlorodiphenylene diisocyanate, the triisocyanates such as triphenyl methane-4,4', 4"-triisocyanate, 1,3,5-trisocyanate benzene and 2,4,6-triisocyanate toluene; and the tetraisocyanates such as 4,4'-diphenyl-dimethyl methane 2,2', 5,5'-tetraisocyanate; the polymerized polyisocyanates such as tolylene diisocyanate dimers and trimers and the like.

Any suitable aliphatic, cycloaliphatic aromatic alkyl monoalcohol and phenolic compound may be used as blocking agent in accordance with the present invention, such as for example, lower aliphatic alcohols, such as methyl, ethyl, chloroethyl, propyl, butyl, cyclohexyl, heptyl, octyl, nonyl 3,3,5-trimethyhexanol, decyl and lauryl alcohols, and the like, the aromaticalkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, xylenol, nitrophesol, chlorophenol, ethylphenol, 1-butyl phenol and 2,5-di-t-butyl- 4-hydroxy toluene. Minor amounts of even higher molecular weight relatively nonvolatile monoalcohols may also be used.

Additional blocking agents include tertiary hydroxyl amines such as diethylethanolamine and oximes such as methylethyl ketone oxime, acetone oxime and cyclohexanone oxime. Use of oximes and phenols is particularly useful because specific polyisocyanates blocked with these agents uncap at relatively low temperatures without the need for externally added urethane forming catalysts such as those described below.

The organic polyisocyanate-blocking agent adduct is formed by reacting a sufficient quantity of blocking agent with the organic polyisocyanate to insure that no free isocyanate groups are present.

A grind resin may also be used in the basecoat compositions of the present invention. The grind resin may be comprised of a number of water soluble polyurethane resins, which may be different in chemical character to the principal or major vehicle resin, e.g., in a particular basecoat formulation a terminally stabilized polyurethane compound may be used as the principal resin and a laterally stabilized polyurethane resin be used as the grind resin. Both laterally stabilized and terminally stabilized nonionic polyurethane resins of this invention may be used as grind resins to formulate paint. The grind resin may range between about 2 and about 25% by weight of the total solids in the coating composition and preferably comprises about 5–40% by weight of the basecoat composition.

Pigments may be incorporated into the basecoat composition to provide the desired cosmetic characteristics. This is done by mixing pigments with the above-described grind resin, and in addition, optionally, aminoplast resin to form a pigment paste. In a preferred embodiment, the methodology of preparing a pigment paste with the nonionic polyurethane resins of the present invention has been simplified in comparison to that used to make pigment paste with anionic polyurethane resins. In this method, the nonionic polyurethane resin is simply mixed with pigment. Aminoplast cross-linking agents may also be added, but such addition is not preferred.

The final pigment paste comprises about 3% to about 65% by weight of a pigment, and about 5% to about 65% by weight of a laterally or terminally stabilized polyurethane resin and optionally, up to 50% by weight of a cross-linking agent.

Any standard pigment known in the art may be used with resins of the present invention so long as these pigments can be formulated without affecting the desired characteristics of the resins. Specific examples of the dye stuffs or pigments may be inorganic or organic, for example, graphite, carbon black, zinc chromate, strontium chromate, barium chromate, lead chromate, lead cyamide, titanium dioxide, zinc oxide, cadmium sulfide, iron oxide, aluminum flakes, zinc sulfide, phthalo cyanine complexes, naphthol red, quinacridones and halogenated thioindigo pigments, among others.

Preferred aluminum flake pigments are available from Silberline Corp, Lansford, Pennsylvania or from Eckart Werke, Gunterstahl, West Germany. The aluminum flake pigments provide the coating with an enhanced "metallic veneer". In a preferred embodiment of the present invention standard grade aluminum stabilized with phosphate ester is used. Other metallic flake pigments, for example, silver may also be used. The metallic pigments may also be mixed with non-metallic pigments, but these are to be carefully chosen so as not to diminish the desired metallic effect.

The resinous dispersions of the basecoat in compositions are dispersed in deionized water. It is preferred that the deionized water have conductance readings of less than 13 micromhos$^{-1}$ and most preferably less than about 5 micromhos$^{-1}$ to prevent gassing caused by the reaction of aluminum with water. Deionized water is also chosen to avoid salts that naturally occur in tap water. Other solvents may also be employed with the deionized water. An especially preferred solvent is Butyl Cellosolve TM which aids mixing, formulating and dispersing pigment in the basecoat composition. Other solvents can also be used, for example, low-boiling mono and polyhydric alcohols, ethers, esters, ketones and other organics. The organic solvent, which comprises at most about 80% of the basecoat composition, and preferably comprises about 10% to 20% by weight of the basecoat composition (including water) may be selected to promote the dispersibility of individual components in the final basecoat composition (plasticizer characteristics) and for its low volatility characteristics.

A rheology control agent is also preferably incorporated into the basecoat composition. The rheology control agent controls the viscosity of the resulting composition and is incorporated in amounts that will prevent sagging or running after a basecoat is sprayed onto a vertical surface such as an automobile body. The direct result of incorporating a rheology control agent is to provide flow control, body and sprayability. Another favorable result of adding a rheology control agent is to allow for the deposition of a thicker coating, allowing more complete coverage of a substrate. The sprayed coatings containing these agents also exhibit greater orientation of the flake pigments on the final coated substrate. Rheology control agents which can be used in embodiments of the present invention include the fumed silica compounds and the bentonite clays. Preferred fumed silica compounds are the hydrophobic silica compounds, for example Aerosil R972, available from DeGussa Corporation, (Frankfurt, West Germany). Another rheology control agent which may be used, and in certain basecoat compositions, may be preferred is a synthetic sodium lithium magnesium silicate hectorite clay. An example of one such clay is Laponite RD, available from Laporte, Inc (Saddlebrook, Jersey). In certain preferred embodiments rheology control agents are mixed. The rheology control agent when it is included, generally comprises from 0% to about 20 percent by weight of the basecoat composition and preferably comprises between about 1 percent and about 5 percent by weight of the final basecoat composition.

In general, the particle size of the rheology control agent plays a role in the overall thixotropic properties of these resins. Rheology control agents in embodiments of this invention are suspended in the material. It may be proposed that the suspended rheology control agents function, at least in part, through coulombic or electrostatic interactions.

In general, the particle sizes can be from less than 0.01 microns to over about 200 microns. These sizes can be adapted to develop in part the rheology properties sought. In appropriate circumstances, the particle sizes may be from about 1 to about 10 microns.

Any additional agent used, for example, surfactants, fillers, stabilizers, wetting agents, dispersing agents, adhesion promoters, etc. may be incorporated into the basecoat composition. While the agents are well-known in the prior art, the amount used must be carefully controlled to avoid adversely affecting the coating and quick-drying characteristics.

The final basecoat composition is adjusted to a pH of between 6.0 and 8.0. Viscosity may be adjusted using deionized water. Final basecoat compositions are comprised of the following components in the indicated weight ratios.

TABLE I

General Description of a Silver Metallic Paint

| Ingredient | Amount (% by weight of Solids of Final Basecoat composition) |
|---|---|
| Polyurethane resin | 20–80% |
| Melamine | 5–50% |
| Rheology Control Agent | 0–20% |
| Pigment (Includes Aluminum Flakes) | 0–20% |
| Acid Catalyst | 0–5% |

The basecoat compositions described hereinabove can be applied to a metal or plastic substrate in one or two coats using for example an air atomizer (Binks Model 60 spray gun, available from Binks Manufacturing Corporation, (Franklin Park, Ill.), or by using other conventional spraying means. The basecoat compositions are preferably sprayed at a 50–80psi, and a relative humidity of between 50 and 90% (optimally at 60–80% relative humidity) and a temperature of 70°–90° F.

After being deposited, the basecoat compositions are flash dried within a temperature range of about room temperatures to about 145 degrees F. The preferred flash temperature is about 120 degrees. The flash conditions described herein result in about 90% of the solvents (water plus organics) being flashed from the basecoat in this short period of time.

After the first basecoat is deposited, a second basecoat can be deposited over the first without drying (flash off), or alternatively, a clearcoat may be deposited over the flashed basecoat. It is a surprising result of the use of the nonionic resins of the present invention that when straight shade (non-metallic) or metallic pigments are used, one coat of basecoat might be used to provide excellent cosmetic characteristics. Any number of clearcoat compositions known in the art may be used. Any known unpigmented or other transparently pigmented coating agent is in principle, suitable for use as a topcoat. A typical top coat composition contains 30–60% film forming resin and 40–70% volatile organic solvent After the clear coat is coated onto the basecoat layer, the multi-layer coating is then baked to cross-link the polymeric vehicle and to drive the small amount of residual water and organic solvent from the multi-layered polymeric composition. A preferred baking step involves heating the coated substrate for a period of 10–60 minutes at a temperature of between 150 and 300 degrees F. The baking step cures the coating to a hard, durable film.

The final multi-layer coated substrate comprises:

(a) a waterborne basecoat composition comprising about 20 to about 80% by weight of said basecoat composition of a polyurethane composition;

(b) about 5% to about 50% by weight of a cross-linking agent;

(c) optionally, up to about 20% by weight of a rheology control agent;

(d) about 5% to about 65% by weight of a pigment paste; and (e) a clear top coat.

The invention will be further described in connection with several examples which follow. These examples are shown by way of illustration of the invention and are not meant to limit the scope of the invention. All parts and percentages in the examples are by weight unless otherwise indicated.

EXAMPLE 1

Preparation of Polyester Resin A

A polyester polyol resin is prepared by charging a reaction vessel flask equipped with a fractionating column, with 551.9 g (15.8% of the polyester resin) of isophthalic acid, 1923 g (54.9%) Empol 1010 (dimer fatty acid available from Emery Chemical Co.), and 1025.1 g (29.3%) of 1,6-hexanediol and 100 g of toluene. Additional toluene may be added to fill the trap. The mixture was heated under nitrogen and the water of condensation was removed. During this heating 35.7 g of water is distilled off. Heating was continued at approximately 200 degrees C. until the acid number is less than or equal to 8. The remaining toluene is then vacuum stripped at 200° C. to produce a polyester resin for use in the polyurethane resin.

EXAMPLE 2

Preparation of Polyester B

A reaction vessel is charged with 960.0 g (43.5 WGT %) of neopentyl glycol, 664.6 g (30.1 WGT %) of isophthalic acid, 584.7 g (26.5 WGT %) of adipic acid, and 50.0 g of toluene. The mixture is heated under nitrogen to 240° C. until an acid number of 3.5 is reached.

EXAMPLE 3

Preparation of Terminally Stabilized polyurethane resin 42.0 g of methoxy polyethylene oxide of 2000 equivalent weight, 88.5 g of IPDI, and 50.0 g of glycol ether PM acetate are charged to a reactor and heated to 95° C. for 2 hours under nitrogen. The mixture is cooled to 30° C., then 252.0 g of polyester A, 9.7 g of neopentyl glycol, and 25.0 g of trimethylolpropane are added. The mixture is heated to 110° C. until all NCO groups have reacted. The mixture is cooled to 80° C. then 90.0 g of isopropanol is added. The mixture is further cooled to 68° C. and 420.0 g of deionized water is added in under vigorous agitation over 10 minutes. The resulting dispersion has a solids content of 42.4% and an average particle size of 140 nm.

EXAMPLE 4

Preparation of Terminally Stabilized Polyurethane resin 44.1 g of a butanol-initiated random copolymer of 75% ethylene oxide and 25% propylene oxide of 2100 equivalent weight, 88.5 g of IPDI, and 50.0 g of glycol ether PM acetate are charged to a reactor and heated to 95° C. for 2 hours under nitrogen. The mixture is allowed to cool to 30° C. and 260.6 g of polyester A, 9.7 g of neopentyl glycol, and 25.0 g of TMP are added. The mixture is heated to 100° C. until all NCO groups have reacted. The mixture is cooled to 82° C. and 90.0 g of isopropanol is added in. The mixture is further cooled to 57° C. and 420.0 g of deionized water is added in under vigorous agitation over 1 hour. The resulting dispersion has a solids content of 43.0% and an average particle size of 190 nm.

EXAMPLE 5a

Preparation of Laterally Stabilized Polyurethane Resin

Preparation of a methoxypolyether diol

A carbowax diol is prepared by charging a flask with 4538 grams of methoxypolyethylene glycol 2000 and 1015 grams of toluene. The mixture is heated to reflux to remove the water present in the carbowax. When all the water has been removed the temperature of the batch is lowered to 50° C. and 4.5 grams of benzoyl chloride is added and allowed to mix for 10 minutes. At this point 394.7 g of toluene diisocyanate is added to the flask and heated to 70° C. and held until the appropriate isocyanate value is reached. The heat is turned off and 249 grams of diethanolamine is added to the flask. When the exotherm has ended the batch is held 10 minutes. Then a vacuum strip is started to remove all the toluene. Once all the toluene is removed, the diol is ready to be used in the polyurethane formation.

Preparation of a polyurethane resin

A flask is charged with 600 grams of polyester A (example=1), 100 grams of carbowax diol, 50.2 grams of neopentyl glycol, 249.8 grams of isophorone diisocyanate, and 205 grams of propylene glycol monomethyl ether acetate. The mixture is heated to 125° C. and reacted to a constant isocyanate value. Then 44.8 grams of trimethyolpropane is added and reacted for 1 hour at 125 degrees C. Then the batch is cooled to 110° C. and 362.2 grams of ethylene glycol monobutyl ether is added. Then 1632.2 grams of deionized water is added under high agitation to form a dispersion.

EXAMPLE 5B

Grind resin—laterally stabilized non-ionic p-polyester polyurethane

Preparation of a carboxax diol

A carbowax diol is prepared by charging a flask with 4538 grams of methoxypolyethylene glycol 2000 and 1015 grams of toluene. The mixture is heated to reflux to remove the water present in the carbowax. When all the water has been removed the temperature of the batch is lowered to 50° C. and 4.5 grams of benzoyl chloride is added and allowed to mix for 10 minutes. At this point 394.7b grams of toluene diisocyanate is added to the flask and it is heated to 70° C. and held there until the appropriate isocyanate value is reached. The heat is turned off and 249 grams of diethanolamine is added to the flask. When the exotherm has ended the batch is held for 10 minutes. Then a vacuum strip is started to remove all the toluene. Once all the toluene is removed, the diol is ready to be used in polyurethane formation.

Preparation of a polyurethane resin

A flask is charged with 600 grams of polyester A (example=1), 100 grams of carbowax diol, 50.2 grams of neopentyl glycol, 249.8 grams of isophorone diisocyanate, and 205 grams of propylene glycol monomethyl ether acetate. The mixture is heated to 125° C. and reacted to a constant isocyanate value. Then the batch is cooled to 110° C. and 35 grams of diethanolamine is added. Then 1632.2 grams of deionized water is added under high agitation to form a dispersion.

EXAMPLE 6

Preparation of a Terminally stabilized Polyurethane Resin 643.5 g of polyester A, 201.0g of methanol-initiated polyethylene oxide of 1350 equivalent weight, 145.0 g of 17 IPDI, and 175.0 g of methyl propyl ketone are charged to a reactor and heated to 124° C. under nitrogen until a constant NCO equivalent value is obtained. Next, 25.8 g of TMP is added and heating to 124° C. was resumed. After 2 hours reaction time, all NCO groups have reacted, and 255.0 g of monobutyl glycol ether is added. The mixture is cooled to 80° C. and 1775 g of deionized water is added in over 10 minutes under vigorous agitation. The resulting dispersion has a solids content of 31.3% and an average particle size of 60 nm.

EXAMPLE 7

Preparation of Terminally Stabilized polyurethane resin 455.0 g of polyester B, 155.0 g of methanol-initiated polyethylene oxide of 1450 equivalent weight, 10.0 g of TMP, 131.0 g of IPDI, and 132.0 g of methyl propyl ketone are charged to a reactor and heated to 105° C. under nitrogen for six hours, at which time no NCO groups remain unreacted. 200.0 g of monobutyl glycol ether is added and the mixture is cooled to 70° C. Next, 1370.0 g of deionized water is added in over 10 minutes under vigorous agitation. The resulting dispersion has a solids content of 31.5% and a Gardner viscosity of E.

EXAMPLE 8

Preparation of silver metallic basecoat using laterally stabilized nonionic resin

| Component | Parts by Weight | WGT % Non-Volatiles |
|---|---|---|
| 2% Laponite paste | 242.2 | 3.2 |
| Resin from example 5 | 201.1 | 47.7 |
| Aluminum paste (ALCOA 87575) | 32.9 | 14.9 |
| Phosphate ester solution | 1.4 | 0.9 |
| Melamine (Cymel 303) | 51.1 | 31.8 |
| p-Toluenesulfonic acid catalyst (amine blocked) | 9.1 | 1.5 |
| deionized water | 162.2 | |

The polyurethane resin from example 5 is slowly added to the 2% Laponite paste under vigorous agitation. In a separate container the aluminum slurry is prepared by mixing the aluminum paste, phosphate ester solution, and melamine under agitation. The aluminum slurry is slowly added to the resin mixture under high agitation. Deionized water is added to reduce the viscosity of the paint to 14 seconds (#2 FISHER CUP). The pH of the paint is 6.7.

EXAMPLE 9

Preparation of silver metallic basecoat using terminal stabilization nonionic resin The paint is prepared according to the process of example 8 except the terminally stabilized polyurethane resin of example 4 is used. The paint has a viscosity of 14 seconds (#2 FISHER CUP).

Comparison study

Lateral stabilized vs. terminal stabilized silver metallic basecoats

The silver metallic basecoats from examples 8 and 9 were sprayed side-by-side using a siphon automatic spray gun. Both paints were sprayed at 65 PSI over primed steel panels at 82° F. and 44% relative humidity. The panels were baked at 250 degrees F for 30 minutes and the metallic effect was evaluated by comparison with a series of five standard silver metallic panels (1=best). Results were as follows:

| Silver Paint | Metallic Effect (1 = best) |
|---|---|
| example 8 | 5.0 |
| example 9 | 3.0 |

The silver metallic basecoats from examples 8 and 9 were resprayed at 68 degrees F. and 80% relative humidity to test for the sag resistance of the paint. After baking the panels for 30 minutes at 250 degrees F., a relative sag resistance value was assigned to each panel (1=best; no sag, 5=worst; excessive sag). Results are as follows:

| Silver Paint | Sag Resistance (1 = best) |
|---|---|
| example 8 | 5 |
| example 9 | 1 |

The following examples of pigment grind pastes and straight-shade paint are applicable to both types of urethanes (i.e., lateral stabilization and terminal stabilization).

EXAMPLE 10

Preparation of a TiO$_2$ pigment caste

Dispersion of TiO$_2$

The nonionic urethane dispersions have been used to mill TiO$_2$ for example, as supplied by DuPont, Glidden, etc., and more specifically, using DuPont R960HGHG as in the example below:

| | Grams | Grams Non-Volatile |
|---|---|---|
| Nonionic Urethane Dispersion | 1452 | 450 |
| DuPont R960HGHG | 2250 | 2250 |
| Deionized Water | 331 | |

The urethane dispersion is placed in a two gallon vessel equipped with a propellor type agitator. The dry TiO$_2$ is added to the stirred dispersion. Deionized water is used to maintain a fluid paste. After the pigment is added, the slurry is stirred for 30 minutes. The viscosity is adjusted to 75-95 Krebs units (700–1500 cps) with water. Stirring is continued for 15 minutes. The paste is fed through a gravity fed sandmill as obtained from Chicago Boiler Company, charged with ceramic or glass media. Particle sizes of 0–6.5 microns is reached in one or two passes.

EXAMPLE 11

Preparation of a Blue Pigment Paste

Dispersion of Phthalocyanine Blue Pigments

The nonionic urethane dispersions have been used to mill phthalocyanine pigments for example, those supplied by Ciba Geigy, Toyo Ink, Sun Chemical, etc., and more specifically Ciba Geigy X3485 as in the example below:

| | Grams | Grams Non-Volatile |
|---|---|---|
| Nonionic urethane dispersion | 1781 | 552 |
| Ciba Geigy X3485 | 276 | 276 |

The urethane dispersion is placed in a two gallon vessel equipped with a propellor type agitator. The dry pigment is added to the stirred dispersion. After the addition of the pigment, the slurry is stirred 30 minutes. Deionized water may be added if necessary to achieve a viscosity of 60-85 Krebs units (500-1000 cps). Stirring is then continued for 15 minutes The paste is then fed through a gravity fed sandmill as described above until the particle size is 0-12 microns.

EXAMPLE 12

Preparation of a Perylene Pigment Paste

Dispersion of Perylene Pigments

The nonionic urethane dispersions have been used to mill perylene pigments as supplied by Mobay, BASF, etc., more specifically Mobay R6424 in the example below:

|  | Grams | Grams Non-Volatile |
|---|---|---|
| Nonionic urethane dispersion | 2419 | 774 |
| Mobay R6424 | 581 | 581 |
| Deionized Water | 109 | |

The urethane dispersion is charged into a two gallon vessel equipped with a propellor type agitator. The dry pigment is added to the stirred dispersion. Stirring is continued for 30 minutes after the pigment has been added. Deionized water is used to obtain a viscosity of 50-85 Krebs units (200-1000) cps). The slurry is then added to an attritor as supplied by Union Process, Akron, Ohio, charged with stainless steel shot. After 4-8 hours the particle size is 0-6.5 microns.

EXAMPLE 13

Preparation of a Carbon Black Pigment Paste

Dispersion of Carbon Black Pigments

The nonionic urethane dispersions have been used to mill carbon black pigments from De Gussa, Columbian Chemicals, Cabot, etc., more specifically Cabot Black Pearls 1300 in the example below:

|  | Grams | Grams Non-Volatile |
|---|---|---|
| Nonionic Urethane Dispersion | 2800 | 896 |
| Cabot Black Pearls 1300 | 224 | 224 |

The urethane dispersion is charged into a two gallon vessel equipped with a propellor type agitator. The dry pigment is added to the dispersion. Stirring is continued for 30 minutes after the pigment has been added. If necessary deionized water is used to obtain a viscosity of 50-85 Krebs units (200-1000 cps). The slurry is then added to an attritor as supplied by Union Process, Akron, Ohio, charged with stainless steel shot. After 4-8 hours the particle size is 6-12 microns.

EXAMPLE 14

Preparation of a Nonionic White Basecoat

|  |  | # Pigment | # Vehicle | 100# |
|---|---|---|---|---|
| A. | Laponite | 2 | | |
|  | Pluriol P900 | | 2 | |
|  | DI H$_2$O | | | |
|  | Total for A | | | 13.9 |
| B. | Melamine (Cymel 303) | | 31.4 | 6.53 |
|  | Butyl Cellosolve | | | 1.62 |
| C. | Nonionic urethane Dispersion | | 33.5 | 21.7 |

-continued

|  |  | # Pigment | # Vehicle | 100# |
|---|---|---|---|---|
| D. | Fumed Silica (R-972 From DeGussa) | 9.5 | | |
|  | Melamine | | 4.61 | |
|  | Nonionic disperson | | 8.74 | |
|  | Total | | | 16.2 |
| E. | White grind paste (Example 11) | 100.0 | 19.8 | 38.2 |
| F. | Oxazolidine blocked pTSA | | 2.29 | 1.91 |

Part A is mixed under high agitation for 2 hours. Part B is added slowly under agitation followed by Part C. Part D is ground separately in a mill and it and parts E and F are added under agitation. Final adjustments in viscosity are made with deionized water. The pH of the basecoat is 6.0-8.0.

The invention has been described in detail with particular reference to preferred embodiments thereof, but it will be understood that variations and modifications can be affected within the spirit and scope of the invention and that the scope of the invention is to be determined by the claims appended hereto.

What is claimed is:

1. A basecoat composition for spraying or depositing onto a metal or plastic substrate comprising:
(1) a laterally stabilized polyurethane resin comprising the reaction product of:
   (a) at least one organic compound having two or more reactive hydrogen functionalities;
   (b) a nonionic stabilizer prepared by the reaction of:
      (i) a polyether having at least one active hydrogen group with a first polyisocyanate compound to produce a partially capped isocyanate intermediate; and
      (ii) a compound having at least one active amine hydrogen and at least two active hydroxyl groups; and
   (c) at least one second polyisocyanate compound;
(2) a cross-linking agent;
(3) a grind resin; and
(4) a pigment component.

2. A basecoat composition according to claim 1 wherein said at least one organic compound having two or more reactive hydrogen functionalities is selected from the group consisting or polyester polyols, diols, triols and mixtures thereof.

3. The basecoat composition according to claim 1 further comprising a rheology control agent.

4. The basecoat composition according to claim 1 wherein said cross-linking agent is selected from the group consisting of aminoplast resins and capped polyisocyanates.

5. The basecoat composition according to claim 1 wherein said polyether is prepared by a monoalcohol initiated polymerization of ethylene oxide, propylene oxide or mixtures thereof.

6. The basecoat composition according to claim 2 wherein said polyether has a molecular weight of between 1200 and 3000.

7. The basecoat composition according to claim 1 wherein said compound having at least one active amine hydrogen and at least two active hydroxyl groups is diethanolamine.

8. The basecoat composition according to claim 2 wherein said cross-linking agent is selected from the group consisting of aminoplast resins and polyisocyanates.

9. The basecoat composition according to claim 1 wherein said polyisocyanate of said nonionic stabilizer is selected from the group consisting of isophorone diisocyanate and 2,4 toluenediisocyanate.

10. The basecoat composition according to claim 1 wherein said second polyisocyanate compound is selected from the group consisting of isophorone diisocyanate and 2,4 toluenediisocyanate.

11. The basecoat composition according to claim 1 wherein said polyurethane resin is further reacted with a capping agent.

12. The basecoat composition according to claim 11 wherein said capping agent is selected from the group consisting of trimethylolpropane, ethanolamine, and diethanolamine.

13. The basecoat composition according to claim 1 wherein said organic compound is selected from the group consisting of a polyester polyol, an alcohol-containing compound or a mixture thereof.

14. The basecoat composition according to claim 13 wherein said diol is a low molecular weight diol selected from the group consisting of ethylene glycol, propylene glycol, butylene glycol, neopentyl glycol, and 1,6-hexanediol.

15. The basecoat composition according to claim 13 wherein said triol is selected from the group consisting of trimethylolethane, trimethylolpropane, and pentaerythritol.

16. The basecoat composition according to claim 13 wherein said polyester polyol, diol, triol or a mixture thereof comprises at moat about 20 percent by weight of said polyurethane resin.

17. The basecoat composition according to claim 10 wherein said diols, triols, and mixtures, thereof comprise between about 1% and 6% by weight of said polyurethane resin.

18. The basecoat composition according to claim 1 wherein said second isocyanate-containing compound comprises about 10% to about 30% by weight of the final polyurethane resin.

19. A basecoat composition for spraying or depositing onto a metal or plastic substrate comprising:
(1) a terminally stabilized polyurethane comprising the reaction product of:
 (a) at least one organic compound having at least two active hydrogen groups;
 (b) at least one polyether having at least one active hydrogen functionality, and
 (c) a polyisocyante;
(2) a cross-linking agent;
(3) a grind resin; and
(4) a pigment component.

20. The basecoat composition according to claim 19 further comprising at least one trifunctional hydroxyl-containing monomer.

21. The basecoat composition according to claim 19 wherein said cross-linking agent is selected from the group consisting of aminoplast resins and capped polyisocyanates.

22. The basecoat composition according to claim 19 wherein said polyether is prepared by a monoalcohol initiated polymerization of ethylene oxide, propylene oxide, or mixtures thereof.

23. The basecoat composition according to claim 20 wherein said polyether has a molecular weight of between 1200 and 3000.

24. The basecoat composition according to claim 19 wherein said polyurethane resin is further reacted with a capping agent.

25. The basecoat composition according to claim 24 wherein said capping agent is selected from the group consisting of trimethylolpropane, ethanolamine, and diethanolamine.

26. The basecoat composition according to claim 19 wherein said organic compound is selected from the group consisting of polyester polyols, alcohol-containing compounds and mixtures thereof.

27. The basecoat composition according to claim 26 wherein said alcohol-containing compound is a diol, triol, or mixture thereof.

28. The basecoat composition according to claim 27 wherein said diol is a low molecular weight diol selected from the group consisting of ethylene glycol, propylene glycol, butylene glycol, neopentyl glycol, and 1,6-hexanediol.

29. The basecoat composition according to claim 27 wherein said triol is selected from the group consisting of trimethylolethane, trimethylolpropane, and pentaerythritol.

30. The basecoat composition according to claim 27 wherein said alcohol-containing compound comprises at most about 20 percent by weight of said polyurethane resin.

31. The basecoat composition according to claim 30 wherein said alcohol-containing compound comprises between about 1% and 6% by weight of said polyurethane resin.

32. The basecoat composition according to claim 21 wherein said capped polyisocyanate comprises about 10% to about 30% by weight of the final polyurethane resin.

33. The basecoat composition according to claim 19 wherein said organic compound is selected from the group consisting of polyester polyols, diols, triols and mixtures thereof.

34. The basecoat composition according to claim 33 wherein said diol is selected from the group consisting of ethylene glycol, propylene glycol, butylene glycol, neopentyl glycol, and 1,6-hexanediol.

35. The basecoat composition according to claim 63 wherein said triol is selected from the group consisting of trimethylolethane, trimethylolpropane, and pentaerythritol.

36. The basecoat composition according to claim 19 wherein said polyisocyanate is selected from the group consisting of toluenediisocyanate and isophorone diisocyanate.

37. The basecoat composition according to claim 27 wherein said diols, triols and mixtures thereof comprise at most about 20 percent by weight of said polyurethane resin.

38. The basecoat composition according to claim 37 wherein said diols, triols, and mixtures thereof comprises between about 1% and 6% by weight of said polyurethane resin.

39. The resin according to claim 19 wherein said polyisocyanate comprises about 10% to about 30% by weight of the final polyurethane resin.

40. A basecoat composition according to claim 1 further comprising a grind resin which is a laterally stabilized polyester-polyurethane resin.

41. A basecoat composition according to claim 1 further comprising a grind resin which is a terminally stabilized polyurethane resin produced from:

(a) at least one organic compound having at least two reactive hydrogen functionalities;
(b) a polyether containing at least one active hydrogen; and
(c) a polyisocyanate.

42. The basecoat composition according to claim 19 wherein said grind resin comprises a terminally stabilized polyurethane resin produced from:
(a) at least one organic compound having at least two reactive hydrogen functionalities;
(b) a polyether containing at least one active hydrogen; and
(c) a polyisocyanate.

* * * * *